No. 740,674. PATENTED OCT. 6, 1903.
T. J. MARCH.
STOVE.
APPLICATION FILED APR. 10, 1903.
NO MODEL.
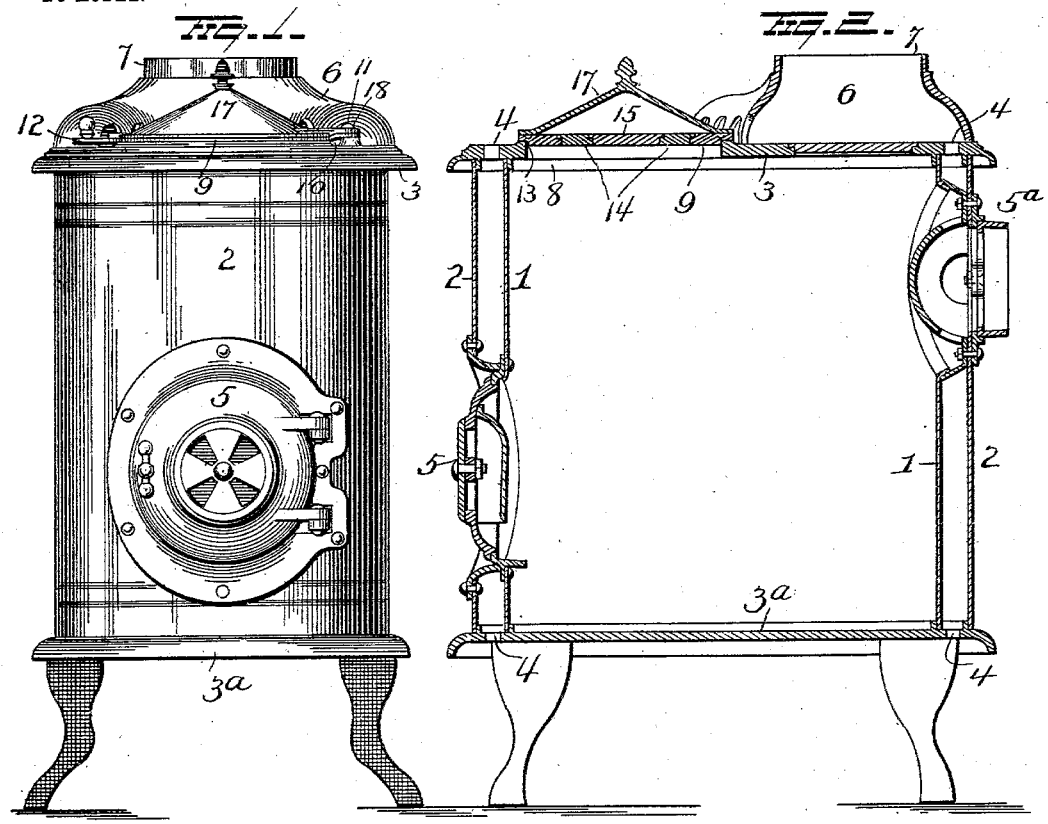
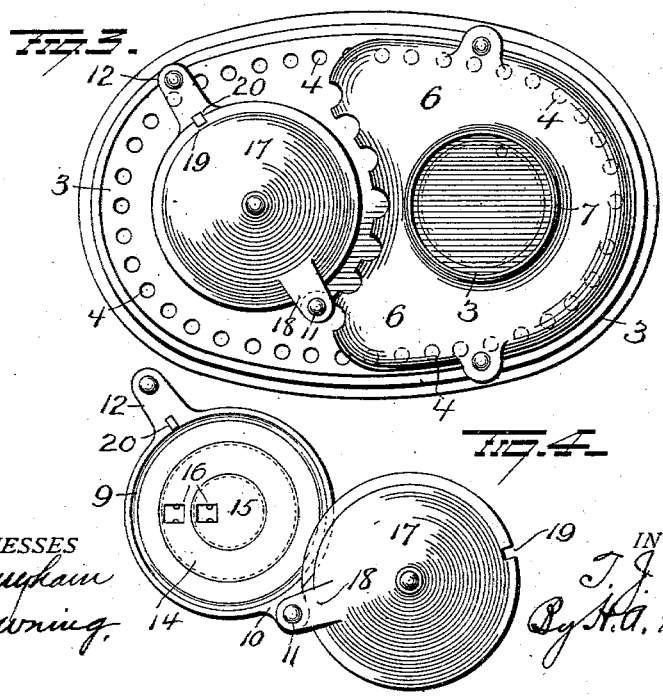
WITNESSES
E. J. Nottingham
G. F. Downing
INVENTOR
T. J. March
By H. A. Seymour
Attorney No. 740,674.

Patented October 6, 1903.

UNITED STATES PATENT OFFICE.

THOMAS J. MARCH, OF POTTSTOWN, PENNSYLVANIA, ASSIGNOR TO THE MARCH-BROWNBACK STOVE COMPANY, OF POTTSTOWN, PENNSYLVANIA.

STOVE.

SPECIFICATION forming part of Letters Patent No. 740,674, dated October 6, 1903.

Application filed April 10, 1903. Serial No. 152,029. (No model.)

*To all whom it may concern:*

Be it known that I, THOMAS J. MARCH, a resident of Pottstown, in the county of Montgomery and State of Pennsylvania, have invented certain new and useful Improvements in Stoves; and I do hereby declare the following to be a full, clear, and exact description of the invention, such as will enable others skilled in the art to which it appertains to make and use the same.

My invention relates to an improvement in stoves, the object of the invention being to provide a stove, particularly a wood-burning stove, which will be a most effectual heater and perfectly distribute the heat and provide improved nested covers for an opening in the top of the stove, permitting its use as a cook-stove when desired.

With this object in view the invention consists in certain novel features of construction and combinations and arrangements of parts, as will be more fully hereinafter described, and pointed out in the claims.

In the accompanying drawings, Figure 1 is a view in elevation illustrating my improvements. Fig. 2 is a view in longitudinal section. Fig. 3 is a plan view, and Fig. 4 is an enlarged view, illustrating in detail the nested covers.

1 represents the oval body or fire-box, having an outer inclosing casing 2 spaced therefrom and forming an air-heating space or chamber all around the body. The stove-top plate 3 and bottom plate 3ª encompass both the body 1 and outer casing 2 and have perforations 4 around their edge communicating with the air-heating chamber to provide air-inlets in the bottom and air-outlets in the top. A suitable fuel, draft, and ash door 5 is provided in one end of the stove, and the smoke-pipe is connected with an outlet-collar 5ª in the opposite end of the stove near its top.

On top of the stove a hood or shell 6 is removably secured and incloses about one-half of the perforations 4 in top 1 and has openings in its front for the reception of heated air from the stove-top. The hood is of a general semicircular or horseshoe shape and has an open collar 7 in its top for the reception of a pipe or flue to convey the heated air collected by the hood to an upper room or elsewhere, as preferred. This hood or shell can of course be removed when it is desired to heat but one room with the stove.

Top 3 has a flanged circular opening 8, which is closed by my improved nested covers, as will now be explained.

9 represents a circular plate having a lug 10 at one side for the reception of a bolt 11 to hinge the plate to the stove-top. The plate 9 also has a lug 12 at its opposite side, perforated for the attachment of a handle to facilitate its operation and is made with a circular flange 13 on its lower face to enter the opening 8 and hold the plate in proper position. This plate 9 has a flanged opening for the reception of a lid 14, and the latter has a flanged opening for the reception of a smaller lid 15, both of said lids having recesses 16 to receive a lid-lifter for permitting their removal.

An ornamental cover 17, which is preferably of the conical shape shown, having a suitable handle at its apex, is made with a perforated lug 18 at one side to receive the bolt 11 and swing thereon. At the opposite side of cover 17 a notch 19 is formed therein to receive a cleat 20 on plate 9, or rather on the handle-lug 12, so that the cover 17 will be locked to plate 9, and when the latter is opened the cover will also be moved to an open position. This is desirable in feeding large logs through opening 8, too large to enter door 5.

When my improvements are in use as a heater alone, plate 9, with the cover 17 thereon, can be swung aside for the reception of wood or other fuel, and when in use as a cooker cover 17 is moved to one side, exposing lids 14 and 15.

The shell or hood 6 is so shaped as to lie parallel with the covers and serves to limit the movement thereof in one direction; but, as before stated, this shell or hood may be dispensed with, and the nested covers can then be moved in either direction.

A great many slight changes and alterations might be made in the general form and arrangement of parts described without departing from my invention, and hence I do not confine myself to the precise details set forth, but consider myself at liberty to make such slight changes and alterations as fairly fall within the spirit and scope of my invention.

Having fully described my invention, what I claim as new, and desire to secure by Letters Patent, is—

1. In a stove, the combination with a body, and an inclosing casing forming an air-chamber around the same, of a hood or shell on top of the stove to confine a portion of the heat therefrom, a plate pivoted to the top and closing an opening therein, and nested covers on said plate.

2. In a stove, the combination with a body, an inclosing casing forming an air-chamber around the same, and top and bottom plates having perforations forming inlets and outlets for air to and from the heating-chamber, of a hollow shell or hood removably secured on the top and confining a portion of the outlet-perforations and adapted to direct the heat so confined to any desired point, an opening in the stove-top, the wall of said opening being parallel with the wall of the hood or shell, and nested covers closing said opening and whose movement in one direction is limited by the hood.

In testimony whereof I have signed this specification in the presence of two subscribing witnesses.

THOMAS J. MARCH.

Witnesses:
WM. K. KULP,
O. F. DUNLAP.